(12) United States Patent  
Ning

(10) Patent No.: US 12,541,239 B2  
(45) Date of Patent: Feb. 3, 2026

(54) METHOD, APPARATUS AND SYSTEM FOR DETECTING TIMING OF SERVER

(71) Applicant: SUZHOU METABRAIN INTELLIGENT TECHNOLOGY CO., LTD., Jiangsu (CN)

(72) Inventor: Chen Ning, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 108 days.

(21) Appl. No.: 18/564,670

(22) PCT Filed: Jun. 7, 2022

(86) PCT No.: PCT/CN2022/097423  
§ 371 (c)(1),  
(2) Date: Nov. 28, 2023

(87) PCT Pub. No.: WO2023/103307  
PCT Pub. Date: Jun. 15, 2023

(65) Prior Publication Data  
US 2024/0256024 A1    Aug. 1, 2024

(30) Foreign Application Priority Data  
Dec. 6, 2021 (CN) .......................... 202111472295.9

(51) Int. Cl.  
*G06F 1/00* (2006.01)  
*G06F 1/28* (2006.01)  
*G06F 11/30* (2006.01)

(52) U.S. Cl.  
CPC ..................................... *G06F 1/28* (2013.01)

(58) Field of Classification Search  
CPC ........................................................ G06F 1/28  
See application file for complete search history.

(56) References Cited

U.S. PATENT DOCUMENTS

| | | | |
|---|---|---|---|
| 6,856,242 B2 * | 2/2005 | Trent ...................... | G08B 3/10 |
| | | | 340/384.1 |
| 10,663,998 B1 * | 5/2020 | Salus ..................... | G05F 1/613 |

(Continued)

FOREIGN PATENT DOCUMENTS

| | | | | |
|---|---|---|---|---|
| CN | 105824388 A | * | 4/2016 | ............... G06F 1/30 |
| CN | 107526664 A | | 12/2017 | |

(Continued)

OTHER PUBLICATIONS

International Search Report for PCT/CN2022/097423 (Aug. 25, 2022).

(Continued)

*Primary Examiner* — Mohammed H Rehman  
(74) *Attorney, Agent, or Firm* — Merchant & Gould P.C.

(57) ABSTRACT

A method, apparatus and system for detecting a timing of a server are provided. The method includes: identifying a state of a server when a power-on signal or a power-off signal of the server is detected; when the state of the server is a power-on state, respectively recording a timestamp when a Power Good (PG) signal of respective Voltage Regulator (VR) turns active; obtaining, according to the timestamp when the PG signal of the respective VR turns active, an actual output voltage timing of the respective VR when the server is powered on; when the state of the server is a power-off state, respectively recording a timestamp when the PG signal of the respective VR turns inactive; and obtaining, according to the timestamp when the PG signal of the respective VR turns inactive, the actual output voltage timing of the respective VR when the server is powered off.

19 Claims, 4 Drawing Sheets

(56) References Cited

U.S. PATENT DOCUMENTS

| | | | | |
|---|---|---|---|---|
| 2013/0132741 A1* | 5/2013 | Chen | ................. | G06F 1/26 |
| | | | | 713/300 |
| 2014/0298094 A1* | 10/2014 | Aliberti | ................. | G06F 1/28 |
| | | | | 714/30 |
| 2020/0403434 A1* | 12/2020 | Jin | ................. | H03K 17/04123 |
| 2022/0137687 A1* | 5/2022 | Chun | ................. | G06F 1/26 |
| | | | | 713/300 |
| 2025/0076911 A1* | 3/2025 | Sharma | ................. | G05F 1/575 |

FOREIGN PATENT DOCUMENTS

| | | | |
|---|---|---|---|
| CN | 107797050 | A | 3/2018 |
| CN | 108304299 | A | 7/2018 |
| CN | 110515802 | A | 11/2019 |
| CN | 111190560 | A | 5/2020 |
| CN | 112231130 | A | 1/2021 |
| CN | 112965864 | A | 6/2021 |
| CN | 113093619 | A | 7/2021 |
| CN | 113742166 | A | 12/2021 |
| CN | 113868101 | A | 12/2021 |
| KR | 20190021848 | A | 3/2019 |
| WO | 2021/169260 | A1 | 9/2021 |

OTHER PUBLICATIONS

Search Report for Chinese Patent Application No. 2021114722959 (Jan. 6, 2022).
Search Report for Chinese Patent Application No. 2021114722959 (Jan. 24, 2022).

* cited by examiner

METHOD, APPARATUS AND SYSTEM FOR DETECTING TIMING OF SERVER

CROSS-REFERENCE TO RELATED APPLICATION

The present application is a National Stage Application of PCT International Application No. PCT/CN2022/097423, filed on Jun. 7, 2022, which claims the benefit of priority to Chinese Patent Application 202111472295.9, filed in the China National Intellectual Property Administration on Dec. 6, 2021, and entitled "Method, Apparatus and System for Detecting Timing of Server", the entire contents of which are herein incorporated by reference. To the extent appropriate, a claim of priority is made to each of the above-disclosed applications.

TECHNICAL FIELD

The present disclosure relates to the technical field of computers, and in particular, to a method, apparatus and system for detecting a timing of a server.

BACKGROUND

At present, the server industry is becoming increasingly mature, with more and more server manufacturers emerging. At the same time, due to the increasing number of clients spread throughout the country and even all over abroad, once a server encounters a problem, the cost generated by on-site maintenance will increase accordingly. Moreover, many problems may only occur once, if not monitored and analyzed in real time, these problems may never recur and cannot be resolved, and thus the clients cannot be provided with a satisfactory response. Based on this situation, it is urgent to introduce a "fault diagnosis function" into the server.

The "fault diagnosis function" refers to defining a series of events on the basis of a Baseboard Management Controller (BMC) and a Complex Programmable Logic Device (CPLD) of the server, such that when the server encounters a problem, logs may be recorded on a Web interface of the BMC, so as to achieve the effects of remotely analyzing and positioning a fault in real time. The "fault diagnosis function" has been introduced starting from a Whitley platform of the Intel, but this function did not achieve an expected effect. When encountering server downtime problems, the clients still question the timing of the server and require to measure the timing of signals one by one, this not only adds a large workload, but also leads to a waste of human resources.

In view of this, how to provide a method, apparatus and system for detecting a timing of a server that may solve the above technical problem becomes a problem to be solved in the present disclosure.

SUMMARY

The embodiments of the present disclosure provide a method for detecting a timing of a server, including:
identifying a state of a server when a power-on signal or a power-off signal of the server is detected;
when the state of the server is a power-on state, respectively recording a timestamp when a Power Good (PG) signal of respective Voltage Regulator (VR) turns active;
obtaining, according to the timestamp when the PG signal of the respective VR turns active, an actual output voltage timing of the respective VR when the server is powered on;
when the state of the server is a power-off state, respectively recording a timestamp when the PG signal of the respective VR turns inactive; and
obtaining, according to the timestamp when the PG signal of the respective VR turns inactive, the actual output voltage timing of the respective VR when the server is powered off.

In an embodiment, obtaining, according to the timestamp when the PG signal of the respective VR turns active, the actual output voltage timing of the respective VR when the server is powered on includes:
compensating the timestamp when the PG signal of the respective VR turns active, so as to obtain a first actual output voltage timestamp corresponding to the timestamp when the PG signal of the respective VR turns active; and
obtaining, according to the respective first actual output voltage timestamp, the actual output voltage timing of the respective VR when the server is powered on.

In an embodiment, obtaining, according to the timestamp when the PG signal of the respective VR turns inactive, the actual output voltage timing of the respective VR when the server is powered off includes:
compensating the timestamp when the PG signal of the respective VR turns inactive, so as to obtain a second actual output voltage timestamp corresponding to the timestamp when the PG signal of the respective VR turns inactive; and
obtaining, according to the respective second actual output voltage timestamp, the actual output voltage timing of the respective VR when the server is powered off.

In an embodiment, compensating the timestamp when the PG signal of the respective VR turns active, so as to obtain the first actual output voltage timestamp corresponding to the timestamp when the PG signal of the respective VR turns active includes:
acquiring a pre-recorded first time deviation corresponding to the respective VR, wherein the pre-recorded first time deviation is a time deviation between the PG signal of the VR and a corresponding actual output voltage during a power-on process of the server; and
respectively compensating, according to the first time deviation corresponding to the respective VR, the timestamp when the PG signal of the corresponding VR turns active, so as to obtain the first actual output voltage timestamp corresponding to the timestamp when the PG signal of the respective VR turns active.

In an embodiment, compensating the timestamp when the PG signal of the respective VR turns inactive, so as to obtain the second actual output voltage timestamp corresponding to the timestamp when the PG signal of the respective VR turns inactive includes:
acquiring a pre-recorded second time deviation corresponding to the respective VR, wherein the pre-recorded second time deviation is a time deviation between the PG signal of the VR and the corresponding actual output voltage during a power-off process of the server; and
respectively compensating, according to the second time deviation corresponding to the respective VR, the timestamp when the PG signal of the corresponding VR turns inactive, so as to obtain the second actual output voltage timestamp corresponding to the timestamp when the PG signal of the respective VR turns inactive.

In an embodiment, the first time deviation corresponding to the respective VR or the second time deviation corresponding to the respective VR is acquired from a flash memory.

In an embodiment, the method further includes:
storing the actual output voltage timing of the respective VR in a register, so that a BMC acquires the actual output voltage timing of the VR and displays the actual output voltage timing of the VR in a form of a timing diagram.

In an embodiment, the method further includes:
receiving time information sent by the BMC; and
parsing the time information to generate time information with an order of magnitude smaller than a second, and performing time synchronization.

In an embodiment, the time information sent by the BMC is received via an Inter-Integrated Circuit (I2C).

In an embodiment, receiving the time information sent by the BMC is:
receiving the time information sent by the BMC at a preset time interval.

The embodiments of the present disclosure further provide an apparatus for detecting a timing of a server, including:
an identification module, configured to identify a state of a server when a power-on signal or a power-off signal of the server is detected;
a first recording module, configured to respectively record, when the state of the server is a power-on state, a timestamp when a PG signal of respective VR turns active;
a first calculation module, configured to obtain, according to the timestamp when the PG signal of the respective VR turns active, an actual output voltage timing of the respective VR when the server is powered on;
a second recording module, configured to respectively record, when the state of the server is a power-off state, a timestamp when the PG signal of the respective VR turns inactive; and
a second calculation module, configured to obtain, according to the timestamp when the PG signal of the respective VR turns inactive, the actual output voltage timing of the respective VR when the server is powered off.

The embodiments of the present disclosure further provide a system for detecting a timing of a server, including a BMC and a CPLD, wherein the CPLD is configured to execute operations of the method for detecting the timing of the server as described above.

The embodiments of the present disclosure further provide a computer device, including a memory and one or more processors, wherein the memory stores a computer-readable instruction, and when the computer-readable instruction is executed by the one or more processors, the one or more processors execute operations of any method for detecting the timing of the server as described above.

Finally, the embodiments of the present disclosure further provide one or more non-volatile computer-readable storage media storing computer-readable instructions, wherein when the computer-readable instructions are executed by one or more processors, the one or more processors execute operations of any method for detecting the timing of the server as described above.

The details of one or more embodiments of the present disclosure are set forth in the following drawings and description. Other features and advantages of the present disclosure will become apparent from the specification, drawings and claims.

BRIEF DESCRIPTION OF THE DRAWINGS

To illustrate technical solutions in the embodiments of the present disclosure more clearly, a brief introduction on the drawings which are needed in the related art or the embodiments is given below. Apparently, the drawings in the description below are merely some of the embodiments of the present disclosure, based on which other drawings may be obtained by those having ordinary skill in the art without any creative effort.

DETAILED DESCRIPTION

The embodiments of the present disclosure provide a method, apparatus and system for detecting a timing of a server, which may automatically obtain an actual output voltage timing of a VR in use, thereby being high in efficiency, reducing the workload of workers, saving human resources, and facilitating the maintenance and management of a server.

In order to make the objectives, technical solutions and advantages of the embodiments of the present disclosure clearer, a clear and complete description of technical solutions in the embodiments of the present disclosure will be given below; in combination with the drawings in the embodiments of the present disclosure. Apparently, the embodiments described below are merely a part, but not all, of the embodiments of the present disclosure. All of other embodiments, obtained by those having ordinary skill in the art based on the embodiments in the present disclosure without any creative effort, fall into the protection scope of the present disclosure.

Figure 1:
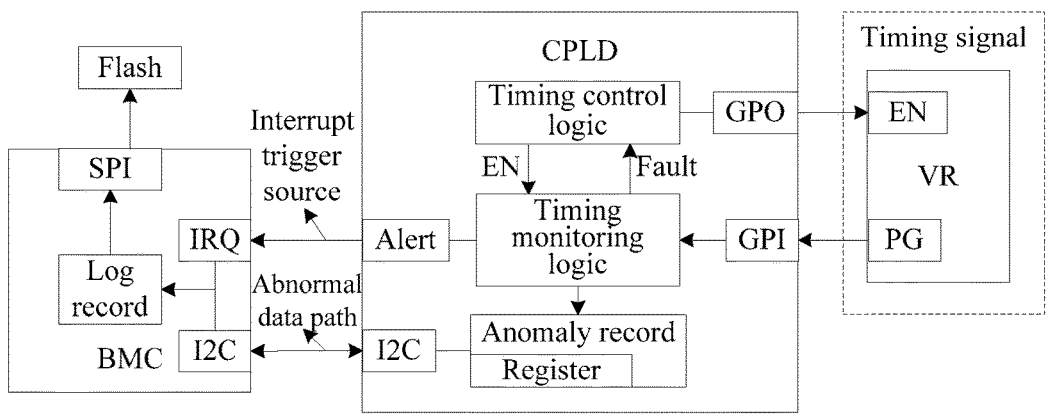
FIG. 1 is an architecture diagram of a fault diagnosis function of a timing part in a server in the related art.

It should be noted that, as shown in FIG. 1 which is an architecture diagram of a fault diagnosis function of a timing part in a server, a CPLD is responsible for the timing control of the entire server, an Enable signal and a PG (Power Good, which indicates that a voltage output by the VR has been stable) of a Voltage Regulator (VR, i.e., a power supply control chip) are connected to the CPLD. The CPLD may detect two faults and record the detected faults in a register. Meanwhile, the CPLD triggers an interrupt to a BMC, so that the BMC reads the register of the CPLD via an I2C, forms a log and displays the log on a Web page, and meanwhile, permanently solidifies the log in a Flash for later use.

Figure 2:
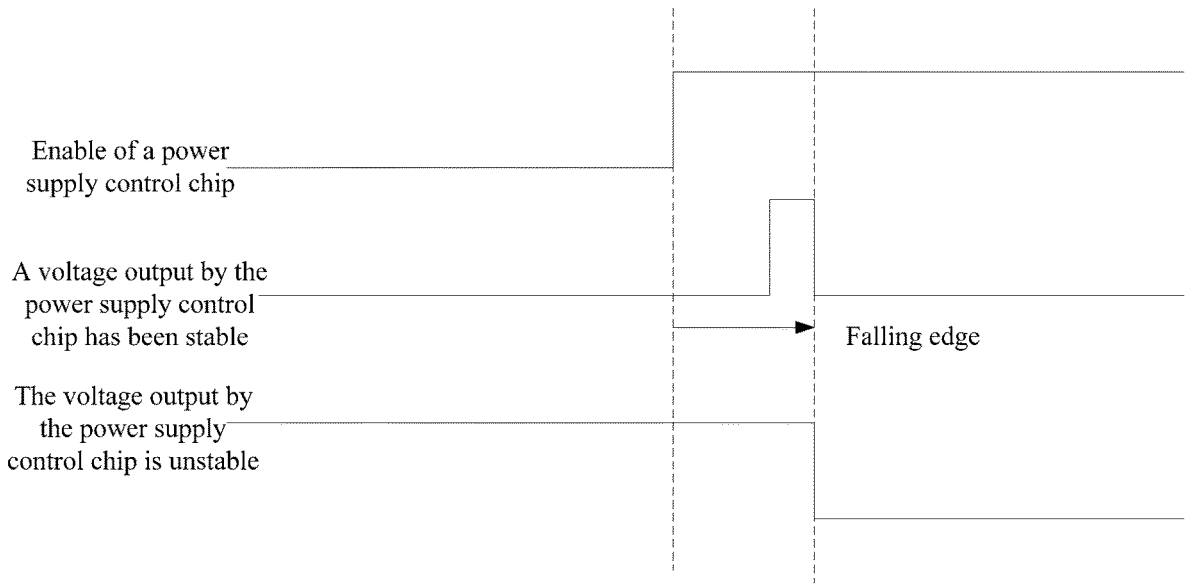
FIG. 2 is a schematic diagram of a PG signal of a VR when a server is powered on and powered off according to one or more embodiments of the present disclosure.

As shown in FIG. 2, an abnormal power-down condition is: when the CPLD identifies that the Enable signal of the VR turns active, but the PG signal of the VR is suddenly pulled down, the CPLD considers that there is a short-circuit problem, and thus records an abnormal power-down log.

A power-on timeout condition is: the CPLD starts timing when a Power Button is pressed down, and records a power-on timeout log if still not receiving the PG signal of the last VR after a period of time.

In view of the above situations, the CPLD only identifies abnormal power-down and power-on timeout faults, but the server still has a downtime problem other than the two faults. In addition, whether a single VR body is faulty is displayed to a user in the current fault diagnosis, but the client and the Intel concern more about whether the entire timing of the server is completely in line with the PDG design of Intel, and if there is no effective check proof, the only solution is to measure signals one by one by using an oscilloscope. In view of these problems, the embodiments of the present disclosure provide a method for detecting a timing of a server. The method is applied to a CPLD, and the specific architecture refers to FIG. 4. Compared with a timing analysis system architecture in the related art (as shown in FIG. 1), a BMC in the embodiments of the present disclosure reads time information sent by a Real-Time Clock (RTC), and sends the time information to the CPLD, so that the CPLD synchronizes its own time information according to the received time information: moreover, a timestamp module (including a register and a UFM shown in FIG. 4) is additionally disposed in the CPLD. The parts in FIG. 4 the same as FIG. 1 are not repeated in the current embodiments of the present disclosure, and the specific introduction of improved parts is as follows.

Figure 3:
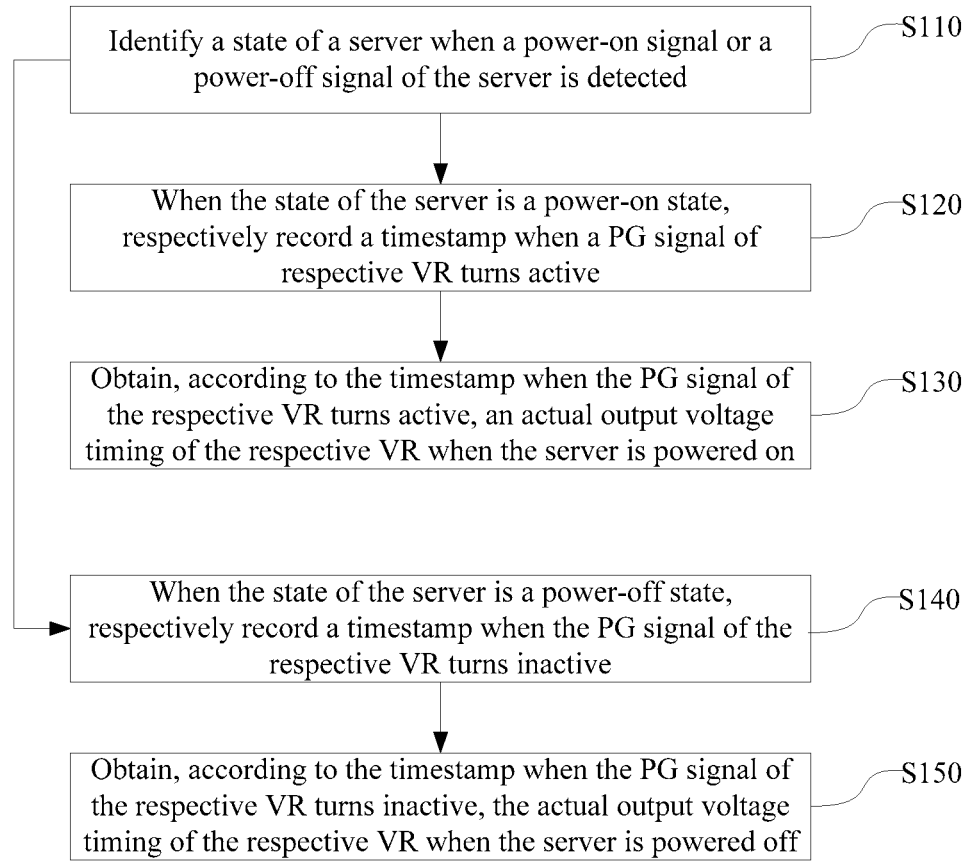
FIG. 3 is a schematic flowchart of a method for detecting a timing of a server provided according to one or more embodiments of the present disclosure.

Please refer to FIG. 3, FIG. 3 is a schematic flowchart of a method for detecting a timing of a server provided in an embodiment of the present disclosure. It is taken as an example that for description that the method is applied to a computer device, and the method includes the following operations S110 to S150.

At S110, a state of a server is identified when a power-on signal or a power-off signal of the server is detected.

It should be noted that, in the embodiment of the present disclosure, when detecting a power-on signal or a power-off signal of the server, the CPLD identifies the power-on signal or the power-off signal, so as to determine the state of the server. For example, when a power-on signal is detected, the server is in a power-on state, and when a power-off signal is detected, the server is in a power-off state.

At S120, when the state of the server is the power-on state, a timestamp when a PG signal of respective VR turns active is respectively recorded.

In some exemplary implementations, when the state of the server is the power-on state, for the respective VR, the timestamp when the PG corresponding to the respective VR turns active is recorded.

At S130, an actual output voltage timing of the respective VR when the server is powered on is obtained according to the timestamp when the PG signal of the respective VR turns active.

In some exemplary implementations, according to the timestamp when the PG corresponding to the respective VR turns active, the actual output voltage timing of the VR when the server corresponding to the respective VR is powered on is obtained.

It should be noted that the process may include the following operations.

The timestamp when the PG signal of the respective VR turns active is compensated, so as to obtain a first actual output voltage timestamp corresponding to the timestamp when the PG signal of the respective VR turns active.

The actual output voltage timing of the respective VR when the server is powered on is obtained according to the respective first actual output voltage timestamp.

In some exemplary implementations, since the entire timing of the server needs to be completely in line with a PDG (Platform Design Guide, which refers to a reference design provided by the Intel for a client) design of the Intel. The timing in the PDG design of the Intel refers to a timing between output voltages of different VRs, instead of a timing between the PG signals of different VRs. In the design of a mainboard, the CPLD may only receive a PG signal of the VR, but cannot monitor an actual voltage signal. In the embodiment of the present disclosure, in order to align to the timing of the PDG of the Intel, it is necessary to compensate the timestamp when the PG turns active, so as to obtain the first actual output voltage timestamp of the corresponding VR when the PG turns active, and then the actual output voltage timing of the respective VR when the server is powered on is obtained according to the first actual output voltage timestamp of the respective VR.

The process of compensating the timestamp when the PG signal of the respective VR turns active, so as to obtain the first actual output voltage timestamp corresponding to the timestamp when the PG signal of the respective VR turns active may include the following operations.

A pre-recorded first time deviation corresponding to the respective VR is acquired, wherein the pre-recorded first time deviation is a time deviation between the PG signal of the respective VR and a corresponding actual output voltage during a power-on process of the server.

According to the first time deviation corresponding to the respective VR, the timestamp when the PG signal of the corresponding VR turns active is respectively compensated, so as to obtain the first actual output voltage timestamp corresponding to the timestamp when the PG signal of the respective VR turns active.

Figure 4:
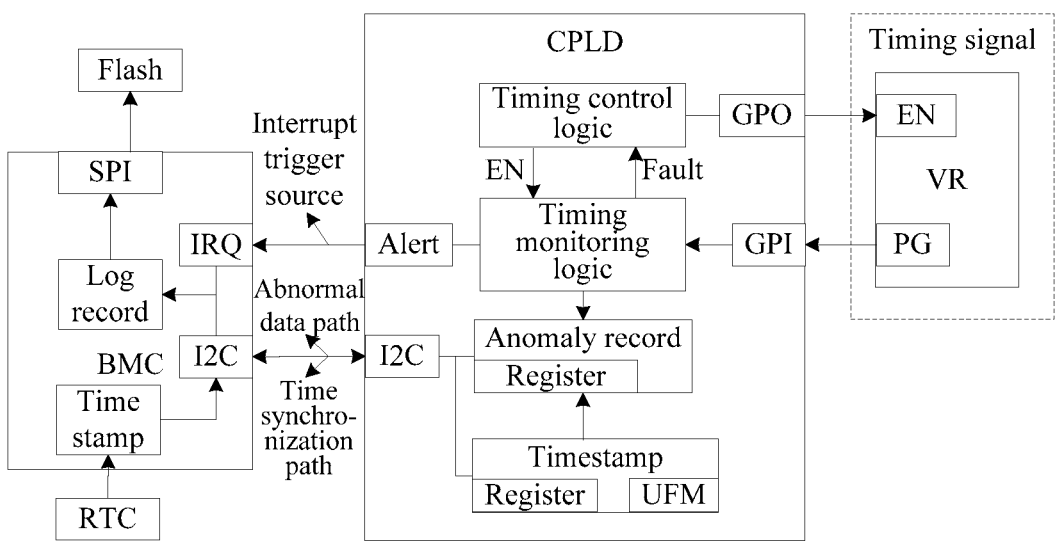
FIG. 4 is an architecture diagram of a fault diagnosis function of a timing part in a server provided according to one or more embodiments of the present disclosure.

It can be understood that, in the embodiment of the present disclosure, it is possible to pre-record the first time deviation between the timestamp when the PG signal of the respective VR turns active and the actual output voltage of the corresponding VR during the power-on process of the server, so as to determine the first time deviation corresponding to the respective VR. In some exemplary implementations, the corresponding relationship between the first time deviation and the respective VR may be stored in an UFM in advance. As shown in FIG. 4, the UFM is a Flash area which is provided by the CPLD for a user, and may be used for storing some important information, so that stored data is not lost after the CPLD is powered off. When necessary, each first time deviation is acquired from the flash memory, after the timestamp when the PG signal corresponding to the respective VR turns active is obtained, the timestamp when the PG signal turns active is compensated by using the corresponding first time deviation, so as to obtain the first actual output voltage timestamp when the PG signal of the corresponding VR turns active.

At S140, when the state of the server is the power-off state, a timestamp when the PG signal of the respective VR turns inactive is respectively recorded.

It should be noted that, when the state of the server is the power-off state, for the respective VR, the timestamp when the PG corresponding to the respective VR turns inactive is recorded.

At S150, the actual output voltage timing of the respective VR when the server is powered off is obtained according to the timestamp when the PG signal of the respective VR turns inactive.

In some exemplary implementations, according to the timestamp when the PG corresponding to the respective VR turns inactive, the actual output voltage timing of the VR when the server corresponding to the respective VR is powered off is obtained. It should be noted that the process may include the following operations.

The timestamp when the PG signal of the respective VR turns inactive is compensated, so as to obtain a second actual output voltage timestamp corresponding to the timestamp when the PG signal of the respective VR turns inactive.

The actual output voltage timing of the respective VR when the server is powered off is obtained according to the respective second actual output voltage timestamp.

Similarly, in the embodiment of the present disclosure, in order to align to the timing of the PDG of the Intel, it is necessary to compensate the timestamp when the PG turns inactive, so as to obtain the second actual output voltage timestamp of the corresponding VR when the PG turns inactive, and then the actual output voltage timing of the respective VR when the server is powered off is obtained according to the second actual output voltage timestamp of the respective VR. The process of compensating the timestamp when the PG signal of the respective VR turns inactive, so as to obtain the second actual output voltage timestamp corresponding to the timestamp when the PG signal of the respective VR turns inactive may include the following operations.

A pre-recorded second time deviation corresponding to the respective VR is acquired, wherein the pre-recorded second time deviation is a time deviation between the PG signal of the VR and the corresponding actual output voltage during a power-off process of the server.

According to the second time deviation corresponding to the respective VR, the timestamp when the PG signal of the corresponding VR turns inactive is respectively compensated, so as to obtain the second actual output voltage timestamp corresponding to the timestamp when the PG signal of the respective VR turns inactive.

It can be understood that, in the embodiment of the present disclosure, it is also possible to pre-record the second time deviation between the timestamp when the PG signal of the respective VR turns inactive and the actual output voltage of the VR during the power-off process of the server, so as to determine the second time deviation corresponding to the respective VR, In some exemplary implementations, the corresponding relationship between the second time deviation and the respective VR may be stored in the flash memory in advance. When necessary, each second time deviation is acquired from the flash memory, after the timestamp when the PG corresponding to the respective VR turns inactive is obtained, the timestamp when the PG turns inactive is compensated by using the corresponding second time deviation, so as to obtain the second actual output voltage timestamp when the PG signal of the corresponding VR turns inactive.

Further, the method may further include the following operations.

The actual output voltage timing of the VR is stored in a register, so that the BMC acquires the actual output voltage timing of the VR and displays the actual output voltage timing of the VR in a form of a timing diagram.

Figure 5:
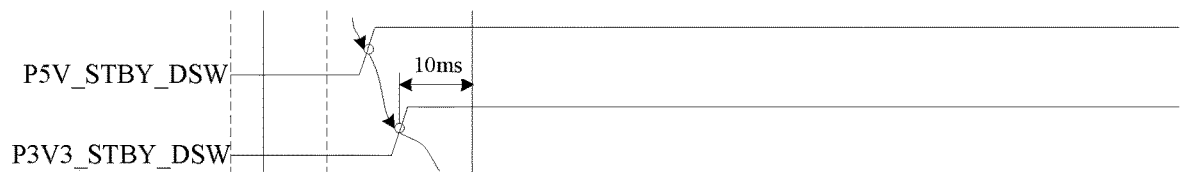
FIG. 5 is a timing diagram provided according to one or more embodiments of the present disclosure.

That is, after the actual output voltage timing of the VR is obtained, the actual output voltage timing of the VR may be stored in the Register (as shown in FIG. 4) in the anomaly record of the CPLD, and the BMC may acquire the actual output voltage timing of the respective VR from the register of the anomaly record of the CPLD, extract information such as timestamp information, a VR name, a VR sequence and time delay from the actual output voltage timing of the respective VR, and display an actual output voltage timing signal of the respective VR in the form of the timing diagram according to these information. In some exemplary implementations, the actual output voltage timing of the respective VR may be displayed in a Web interface, so that the client may conveniently check the actual output voltage timing diagram of the VR, especially when the server is faulty. Whether the timing is faulty may be determined by calling the recorded actual output voltage timing of the respective VR without sequentially measuring the timing by using an oscilloscope, thereby saving a large amount of human resources. For example, the timing diagram displayed in the Web interface is shown in FIG. 5, wherein P5V_STBY_DSW in FIG. 5 represents a timing corresponding to a VR of 5V, and P3V3_STBY_DSW represents a timing corresponding to a VR of 3V3. It may be clearly known from FIG. 5 that the output voltage of the VR of 3V3 turns normal 10 ms after the output voltage of the VR of 5V turns normal.

Further, the method further includes the following operations.

Time information sent by the BMC is received.

The time information is parsed to generate time information with an order of magnitude smaller than a second, and time synchronization is performed.

It should be noted that, since the BMC may only accurately record the timestamp of the log to a second level, a plurality of logs may be recorded in one second, which is far less than the accuracy requirement of fault analysis. Therefore, referring to FIG. 4, in the embodiment of the present disclosure, after reading time information sent by an RTC, the BMC sends the time information to the CPLD in the form of "year, month, day, hour, minute, second". In some exemplary implementations, the BMC may send the time information to the CPLD via an I2C. The CPLD parses the time information sent by the BMC, generates time information with an order of magnitude smaller than a second, then updates and synchronizes the time of the CPLD, and stores the updated time in the register of the timestamp module in FIG. 4. The BMC may send the time information to the BMC at a preset time interval (for example, 200 ms), and the BMC updates its own time information after receiving the time information, so that it may be ensured that the time of the BMC is synchronous in real time.

It can be seen that, in the embodiment of the present disclosure, the state of the server is identified when the power-on signal or the power-off signal is detected: when the state of the server is the power-on state, the timestamp when the PG signal of the respective VR turns active is respectively recorded: the actual output voltage timing of the respective VR when the server is powered on is obtained according to the timestamp when the PG signal of the respective VR turns active: when the state of the server is the power-off state, the timestamp when the PG signal of the respective VR turns inactive is recorded; and the actual output voltage timing of the respective VR when the server is powered off is obtained according to the timestamp when the PG signal of the respective VR turns inactive. In practical applications, the solution of the embodiment of the present disclosure may automatically obtain the actual output voltage timing of the VR, so that the efficiency is high, the workload of workers is reduced, manpower resources are saved, and the maintenance and management of the server are facilitated.

Figure 6:
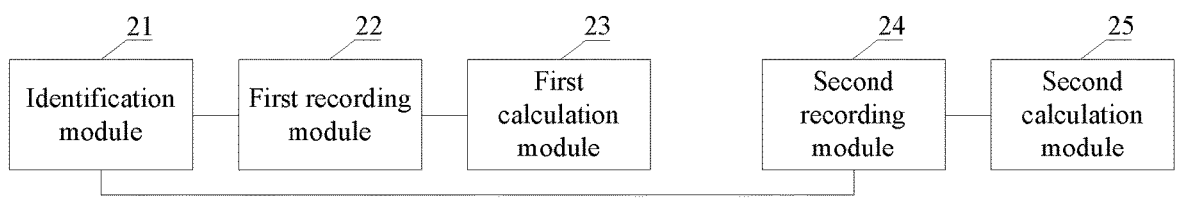
FIG. 6 is a schematic structural diagram of an apparatus for detecting a timing of a server provided according to one or more embodiments of the present disclosure.

On the basis of the above embodiment, an embodiment of the present disclosure further provides an apparatus for detecting a timing of a server, and referring to FIG. 6, the apparatus includes:

an identification module 21, configured to identify a state of a server when a power-on signal or a power-off signal is detected;

a first recording module 22, configured to respectively record, when the state of the server is a power-on state, a timestamp when a PG signal of respective VR turns active;

a first calculation module 23, configured to obtain, according to the timestamp when the PG signal of the respective VR turns active, an actual output voltage timing of the respective VR when the server is powered on;

a second recording module 24, configured to respectively record, when the state of the server is a power-off state, a timestamp when the PG signal of the respective VR turns inactive; and a second calculation module 25, configured to obtain, according to the timestamp when the PG signal of the respective VR turns inactive, the actual output voltage timing of the respective VR when the server is powered off.

It should be noted that, the apparatus for detecting the timing of the server in the embodiment of the present disclosure has the same beneficial effect as the method for detecting the timing of the server provided in the above embodiment, and for the specific introduction of the method for detecting the timing of the server involved in the embodiment of the present disclosure, reference is made to the above embodiment, and thus details are not repeated in the current embodiment of the present disclosure.

On the basis of the above embodiment, an embodiment of the present disclosure further provides a system for detecting a timing of a server, including a BMC and a CPLD, wherein the CPLD is configured to execute operations of the method for detecting the timing of the server as described above.

For example, the CPLD may be configured to implement the operations of: identifying a state of a server when a power-on signal or a power-off signal is detected: when the state of the server is a power-on state, respectively recording a timestamp when a PG signal of respective VR turns active: obtaining, according to the timestamp when the PG signal of the respective VR turns active, an actual output voltage timing of the respective VR when the server is powered on: when the state of the server is a power-off state, respectively recording a timestamp when the PG signal of the respective VR turns inactive; and obtaining, according to the timestamp when the PG signal of the respective VR turns inactive, the actual output voltage timing of the respective VR when the server is powered off.

Figure 7:
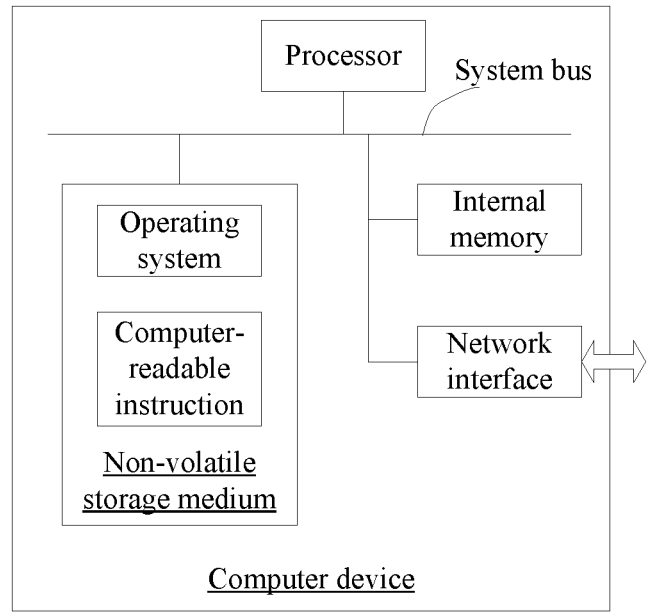
FIG. 7 is a schematic diagram of an internal structure of a computer device provided according to one or more embodiments of the present disclosure.

In an embodiment, a computer device is provided, the computer device may be a server, and an internal structure diagram thereof may be shown in FIG. 7. The computer device includes a processor, a memory and a network interface, which are connected via a system bus. The processor of the computer device is used for providing calculation and control capabilities. The memory of the computer device includes a non-volatile storage medium and an internal memory. The non-volatile storage medium stores an operating system and a computer-readable instruction. The internal memory provides an environment for the operation of the operating system and the computer-readable instruction in the non-volatile storage medium. The network interface of the computer device is used for connecting and communicating with an external terminal via a network. The computer-readable instruction implements a method for detecting a timing of a server when executed by the processor.

Figure 8:
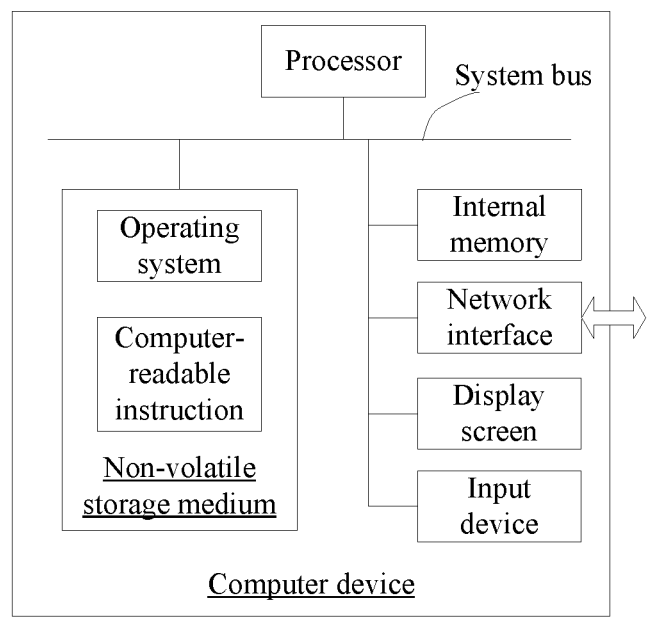
FIG. 8 is a schematic diagram of an internal structure of a computer device provided according to one or more embodiments of the present disclosure.

In an embodiment, a computer device is provided, the computer device may be a terminal, and an internal structure diagram thereof may be shown in FIG. 8. The computer device includes a processor, a memory, a network interface, a display screen and an input device, which are connected via a system bus. The processor of the computer device is used for providing calculation and control capabilities. The memory of the computer device includes a non-volatile storage medium and an internal memory. The non-volatile storage medium stores an operating system and a computer-readable instruction. The internal memory provides an environment for the operation of the operating system and the computer-readable instruction in the non-volatile storage medium. The network interface of the computer device is used for connecting and communicating with an external terminal via a network. The computer-readable instruction implements a method for detecting a timing of a server when executed by the processor. The display screen of the computer device may be a liquid crystal display screen or an electronic ink display screen, and the input device of the computer device may be a touch layer covered on the display screen, or may be a key, a trackball or a touchpad, which is disposed on a housing of the computer device, and may also be an external keyboard, an external touchpad, or an external mouse, etc.

According to a non-volatile computer-readable storage medium provided in an embodiment of the present disclosure, a computer-readable instruction is stored in the non-volatile computer-readable storage medium, and when executed by one or more processors, the computer-readable instruction may implement the operations of the method for detecting the timing of the server in any one of the above embodiments.

It should also be noted that, in the present specification, relational terms, such as first and second, are merely used for distinguishing one entity or operation from another entity or operation, and do not necessarily require or imply that any such actual relationship or order exists between these entities or operations. Moreover, the terms "include". "contain" or any other variants thereof are intended to cover non-exclusive inclusions, such that a process, a method, an article or a device including a series of elements may not only include those elements, but may also include other elements that are not explicitly listed, or may also include elements inherent to such a process, method, article or device. If there are no more restrictions, the element defined by the sentence "including a . . . " does not exclude the existence of other identical elements in the process, the method, the article or the device that includes the element.

Those having ordinary skill in the art may understand that, all or some flows of the methods in the above embodiments may be implemented by a computer-readable instruction instructing related hardware, the computer-readable instruction may be stored in a non-volatile computer-readable storage medium, and when executed, the computer-readable instruction may cause a computer to execute processes including the flows of the embodiments of the above methods. Any reference to a memory, a storage, a database or other media used in various embodiments provided in the present disclosure may include non-volatile and/or volatile memories. The non-volatile memory may include a Read-Only Memory (ROM), a Programmable ROM (PROM), an Electrically Programmable ROM (EPROM), an Electrically Erasable Programmable ROM (EEPROM), or a flash memory. The volatile memory may include a Random Access memory (RAM) or an external cache. By way of illustration and not limitation, the RAM may be available in various forms, such as a Static RAM (SRAM), a Dynamic RAM (DRAM), a Synchronous DRAM (SDRAM), a Dual-Data-Rate SDRAM (DDRSDRAM), an Enhanced SDRAM (ESDRAM), a Synchlink DRAM (SLDRAM), a memory bus (Rambus) direct RAM (RDRAM), a direct memory bus dynamic RAM (DRDRAM), and a memory bus dynamic RAM (RDRAM), etc.

Various technical features of the above embodiments may be combined arbitrarily, for the conciseness of description, not all possible combinations of the technical features in the above embodiments are described, however, as long as there is no contradiction in the combinations of these technical features, the combinations should be considered as falling in the scope recorded in the present specification.

The above embodiments only express several implementations of the present disclosure, and the description thereof is relatively specific and detailed, but cannot be understood as a limitation on the scope of the patent for invention. It should be noted that, for those having ordinary skill in the art, several variations and improvements may also be made without departing from the concept of the present disclosure, and all these variations and improvements fall within the protection scope of the present disclosure. Therefore, the protection scope of the patent of the present disclosure should be subject to the appended claims.

What is claimed is:

1. A method for detecting a timing of a server, performed by a Complex Programmable Logic Device (CPLD) of the server and comprising:
   identifying a state of a server when a power-on signal or a power-off signal of the server is detected;
   when the state of the server is a power-on state, respectively recording a timestamp when a Power Good (PG) signal of respective Voltage Regulator (VR) turns active;
   obtaining, according to the timestamp when the PG signal of the respective VR turns active, an actual output voltage timing of the respective VR when the server is powered on;
   when the state of the server is a power-off state, respectively recording a timestamp when the PG signal of the respective VR turns inactive; and
   obtaining, according to the timestamp when the PG signal of the respective VR turns inactive, the actual output voltage timing of the respective VR when the server is powered off;
   wherein obtaining, according to the timestamp when the PG signal of the respective VR turns active, the actual output voltage timing of the respective VR when the server is powered on comprises: compensating the timestamp when the PG signal of the respective VR turns active, so as to obtain a first actual output voltage timestamp corresponding to the timestamp when the PG signal of the respective VR turns active; and obtaining, according to the respective first actual output voltage timestamp, the actual output voltage timing of the respective VR when the server is powered on;
   obtaining, according to the timestamp when the PG signal of the respective VR turns inactive, the actual output voltage timing of the respective VR when the server is powered off comprises: compensating the timestamp when the PG signal of the respective VR turns inactive, so as to obtain a second actual output voltage timestamp corresponding to the timestamp when the PG signal of the respective VR turns inactive; and obtaining, according to the respective second actual output voltage timestamp, the actual output voltage timing of the respective VR when the server is powered off.

2. The method for detecting the timing of the server according to claim 1, wherein compensating the timestamp when the PG signal of the respective VR turns active, so as to obtain the first actual output voltage timestamp corresponding to the timestamp when the PG signal of the respective VR turns active comprises:
   acquiring a pre-recorded first time deviation corresponding to the respective VR, wherein the pre-recorded first time deviation is a time deviation between the PG signal of the VR and a corresponding actual output voltage during a power-on process of the server; and
   respectively compensating, according to the first time deviation corresponding to the respective VR, the timestamp when the PG signal of the corresponding VR turns active, so as to obtain the first actual output voltage timestamp corresponding to the timestamp when the PG signal of the respective VR turns active;
   compensating the timestamp when the PG signal of the respective VR turns inactive, so as to obtain the second actual output voltage timestamp corresponding to the timestamp when the PG signal of the respective VR turns inactive comprises:
   acquiring a pre-recorded second time deviation corresponding to the respective VR, wherein the pre-recorded second time deviation is a time deviation between the PG signal of the VR and the corresponding actual output voltage during a power-off process of the server; and
   respectively compensating, according to the second time deviation corresponding to the respective VR, the timestamp when the PG signal of the corresponding VR turns inactive, so as to obtain the second actual output voltage timestamp corresponding to the timestamp when the PG signal of the respective VR turns inactive.

3. The method for detecting the timing of the server according to claim 2, wherein the first time deviation corresponding to the respective VR or the second time deviation corresponding to the respective VR is acquired from a flash memory.

4. The method for detecting the timing of the server according to claim 2, wherein the CPLD comprises a timestamp module including a UFM, wherein a corresponding relationship between the first time deviation and the respective VR is stored in the UFM in advance, and a corresponding relationship between the second time deviation and the respective VR is stored in the UFM in advance.

5. The method for detecting the timing of the server according to claim 1, wherein the method further comprises:
   storing the actual output voltage timing of the respective VR in a register, so that a Baseboard Management Controller (BMC) acquires the actual output voltage timing of the VR and displays the actual output voltage timing of the VR in a form of a timing diagram.

6. The method for detecting the timing of the server according to claim 5, wherein the method further comprises:
receiving time information sent by the BMC; and
parsing the time information to generate time information with an order of magnitude smaller than a second, and performing time synchronization.

7. The method for detecting the timing of the server according to claim 6, wherein the time information sent by the BMC is received via an Inter-Integrated Circuit (I2C).

8. The method for detecting the timing of the server according to claim 6, wherein receiving the time information sent by the BMC comprises:
receiving the time information sent by the BMC at a preset time interval.

9. The method for detecting the timing of the server according to claim 6, wherein receiving the time information sent by the BMC comprises:
receiving the time information sent by the BMC after the BMC reads the time information sent by a Real-Time Clock (RTC).

10. The method for detecting the timing of the server according to claim 6, wherein the CPLD comprises a timestamp module including a register, and performing time synchronization comprises:
updating and synchronizing time of the CPLD according to the generated time information, and storing the updated time in the register of the timestamp module.

11. A system for detecting a timing of a server, comprising a Baseboard Management Controller (BMC) and a Complex Programmable Logic Device (CPLD), wherein the CPLD is configured to execute operations of the method for detecting the timing of the server according to claim 1.

12. The system for detecting the timing of the server according to claim 11, wherein the CPLD comprises a timestamp module including a UFM, wherein a corresponding relationship between a first time deviation and the respective VR is stored in the UFM in advance, and a corresponding relationship between a second time deviation and the respective VR is stored in the UFM in advance, wherein the first time deviation is a time deviation between the PG signal of the VR and a corresponding actual output voltage during a power-on process of the server, and the second time deviation is a time deviation between the PG signal of the VR and the corresponding actual output voltage during a power-off process of the server.

13. The system for detecting the timing of the server according to claim 11, wherein the CPLD comprises an anomaly record including a register, and the actual output voltage timing of the respective VR is stored in the register in the anomaly record of the CPLD, so that the BMC acquires the actual output voltage timing of the respective VR from the register of the anomaly record of the CPLD.

14. The system for detecting the timing of the server according to claim 11, wherein the BMC is connected to a Real-Time Clock (RTC), and is configured to reads time information sent by the RTC and send the time information to the CPLD, and the CPLD is configured to receive the time information sent by the BMC, parse the time information to generate time information with an order of magnitude smaller than a second, and perform time synchronization.

15. The system for detecting the timing of the server according to claim 14, wherein the CPLD comprises a timestamp module including a register, and the CPLD is configured to perform time synchronization by: updating and synchronizing time of the CPLD according to the generated time information, and storing the updated time in the register of the timestamp module.

16. The method for detecting the timing of the server according to claim 1, wherein the CPLD comprises an anomaly record including a register, and after obtaining the actual output voltage timing of the respective VR when the server is powered on or obtaining the actual output voltage timing of the respective VR when the server is powered off, the method further comprises:
storing the actual output voltage timing of the respective VR in the register in the anomaly record of the CPLD, so that the BMC acquires the actual output voltage timing of the respective VR from the register of the anomaly record of the CPLD.

17. The method for detecting the timing of the server according to claim 1, wherein the actual output voltage timing of the respective VR comprises: timestamp information, a VR name, a VR sequence and time delay.

18. A computer device, comprising a memory and one or more processors, wherein the memory stores a computer-readable instruction, and when the computer-readable instruction is executed by the one or more processors, the one or more processors execute following operations:
identifying a state of a server when a power-on signal or a power-off signal of the server is detected;
when the state of the server is a power-on state, respectively recording a timestamp when a Power Good (PG) signal of respective Voltage Regulator (VR) turns active;
obtaining, according to the timestamp when the PG signal of the respective VR turns active, an actual output voltage timing of the respective VR when the server is powered on;
when the state of the server is a power-off state, respectively recording a timestamp when the PG signal of the respective VR turns inactive; and
obtaining, according to the timestamp when the PG signal of the respective VR turns inactive, the actual output voltage timing of the respective VR when the server is powered off;
wherein obtaining, according to the timestamp when the PG signal of the respective VR turns active, the actual output voltage timing of the respective VR when the server is powered on comprises: compensating the timestamp when the PG signal of the respective VR turns active, so as to obtain a first actual output voltage timestamp corresponding to the timestamp when the PG signal of the respective VR turns active; and obtaining, according to the respective first actual output voltage timestamp, the actual output voltage timing of the respective VR when the server is powered on;
obtaining, according to the timestamp when the PG signal of the respective VR turns inactive, the actual output voltage timing of the respective VR when the server is powered off comprises: compensating the timestamp when the PG signal of the respective VR turns inactive, so as to obtain a second actual output voltage timestamp corresponding to the timestamp when the PG signal of the respective VR turns inactive; and obtaining, according to the respective second actual output voltage timestamp, the actual output voltage timing of the respective VR when the server is powered off.

19. One or more non-volatile computer-readable storage media storing computer-readable instructions, wherein when the computer-readable instructions are executed by one or more processors, the one or more processors execute following operations:

identifying a state of a server when a power-on signal or a power-off signal of the server is detected;

when the state of the server is a power-on state, respectively recording a timestamp when a Power Good (PG) signal of respective Voltage Regulator (VR) turns active;

obtaining, according to the timestamp when the PG signal of the respective VR turns active, an actual output voltage timing of the respective VR when the server is powered on;

when the state of the server is a power-off state, respectively recording a timestamp when the PG signal of the respective VR turns inactive; and obtaining, according to the timestamp when the PG signal of the respective VR turns inactive, the actual output voltage timing of the respective VR when the server is powered off;

wherein obtaining, according to the timestamp when the PG signal of the respective VR turns active, the actual output voltage timing of the respective VR when the server is powered on comprises: compensating the timestamp when the PG signal of the respective VR turns active, so as to obtain a first actual output voltage timestamp corresponding to the timestamp when the PG signal of the respective VR turns active; and obtaining, according to the respective first actual output voltage timestamp, the actual output voltage timing of the respective VR when the server is powered on;

obtaining, according to the timestamp when the PG signal of the respective VR turns inactive, the actual output voltage timing of the respective VR when the server is powered off comprises: compensating the timestamp when the PG signal of the respective VR turns inactive, so as to obtain a second actual output voltage timestamp corresponding to the timestamp when the PG signal of the respective VR turns inactive; and obtaining, according to the respective second actual output voltage timestamp, the actual output voltage timing of the respective VR when the server is powered off.

* * * * *